Jan. 19, 1971   W. STAECKER, JR   3,555,861
AUTOMATIC COINING PRESS
Filed March 11, 1968   12 Sheets-Sheet 3

INVENTOR.
WILLIAM STAECKER, JR.
BY
Meyer, Tilberry & Body
ATTORNEYS

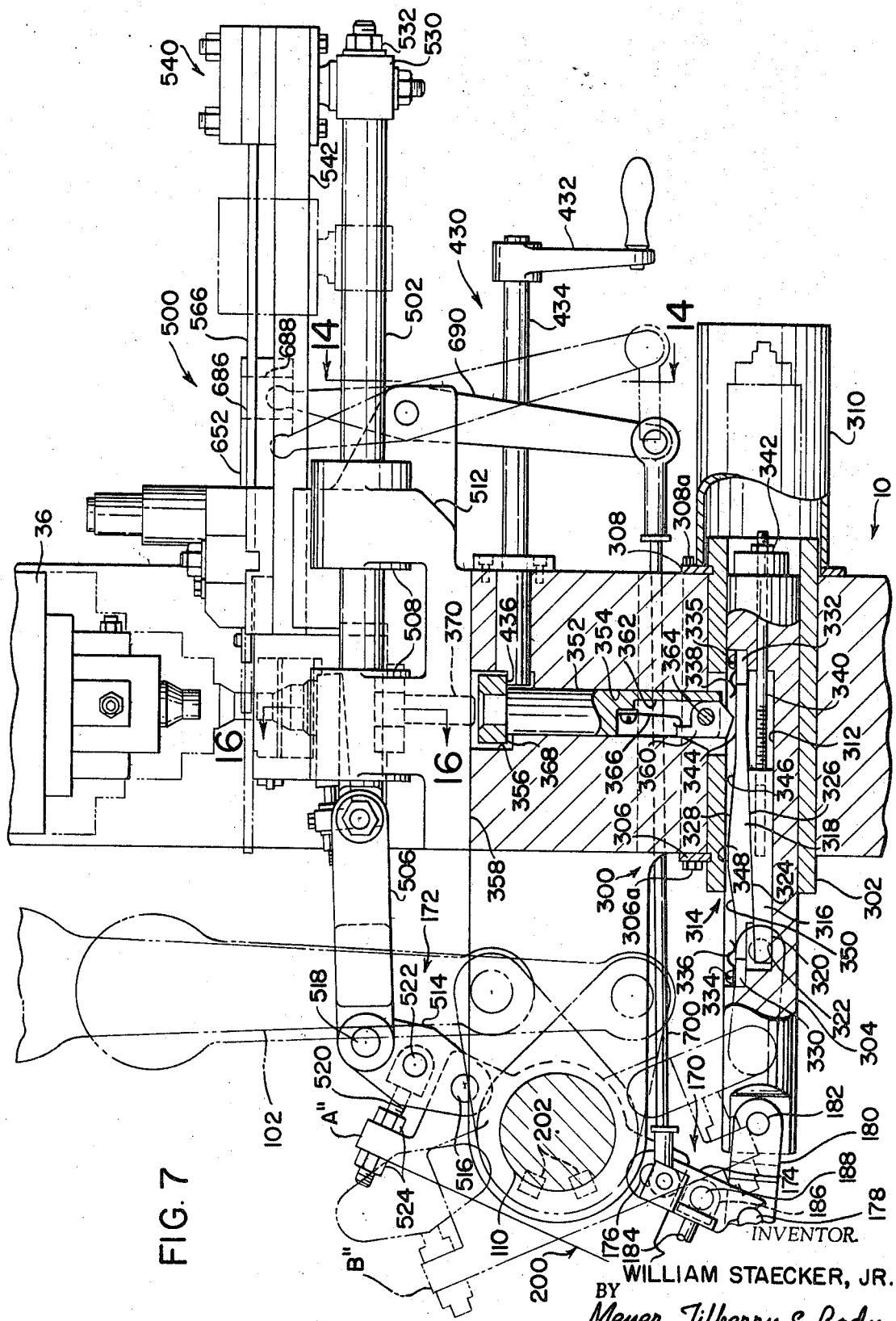

INVENTOR.
WILLIAM STAECKER, JR.
BY
Meyer, Tilberry & Body
ATTORNEYS

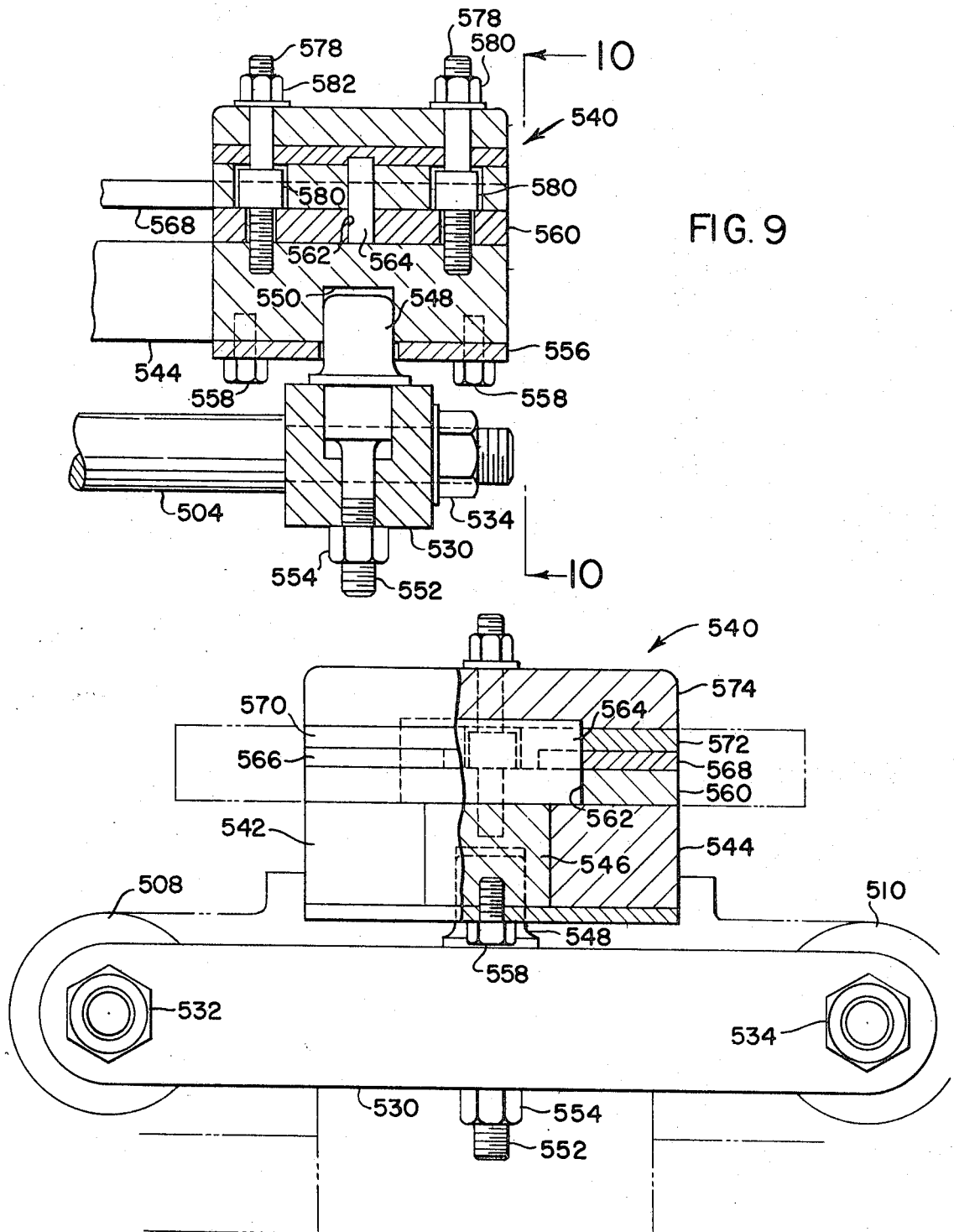

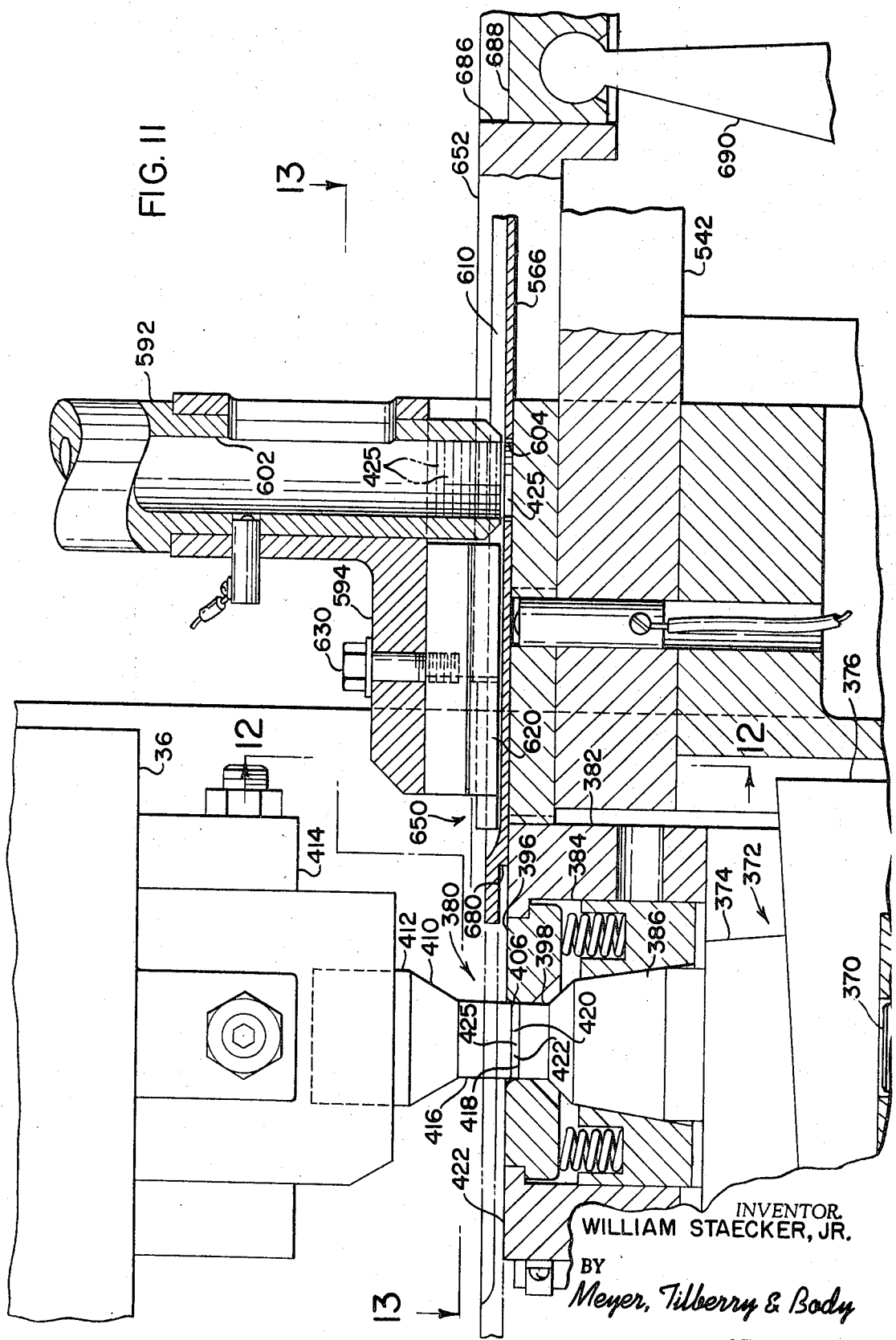

United States Patent Office 3,555,861
Patented Jan. 19, 1971

3,555,861
AUTOMATIC COINING PRESS
William Staecker, Jr., Collaroy, New South Wales,
Australia, assignor, by mesne assignments, to Gulf +
Western Industrial Products Company, Grand Rapids,
Mich., a corporation of Delaware
Filed Mar. 11, 1968, Ser. No. 712,154
Int. Cl. B21j 9/02
U.S. Cl. 72—4      8 Claims

ABSTRACT OF THE DISCLOSURE

An improved press particularly adapted for coining operations and including an improved feed mechanism driven from the main press drive and provided with means which permit each blank to be struck two or more times. Additionally, the feed mechanism is arranged to eliminate the need for lost motion connections and provide continuous smooth feed motion.

---

The present invention is directed toward the press art, and more particularly, toward an improved press and automatic feed mechanism therefor.

The invention is especially suited for use in the manufacture of coins, etc. and will be described with particular reference thereto; however, it will be appreciated that the invention is capable of broader application and could be used in a variety of pressing or forming operations.

In the United States Pat. No. 3,283,551 to Kraft et al., there is disclosed an improved press and automatic feed mechanism which is especially suited for the manufacture of coins. The patent discloses a horizontally reciprocable feed mechanism which is arranged to simultaneously deliver two coin blanks or planchets from a pair of feed tubes to two lower dies in timed relationship with the movement of the press ram which carries the upper die halves. A power take-off interconnects the ram drive crank and the feed mechanism so that the feed mechanism is actuated to feed a set of planchets to the dies with each stroke of the ram. Because the feed mechanism must remain stationary at the ends of its stroke the interconnecting drive train includes means for providing a dwell period. In the aforementioned feed mechanism, a lost motion connection functions to provide the required dwell periods.

Although the arrangement disclosed in the patent is, in general highly satisfactory, it is not capable of performing some coining operations and has some inherent drawbacks. For example, in the manufacture of proof coins, medallions, etc., it is necessary that each blank be struck more than once, usually twice, to assure that the sharp reliefs which exist in the dies are faithfully reproduced on the resulting coin. Prior to the present invention, these operations were usually done manually, the press operator taking each blank separately, placing it in the die, cycling the press twice, and then removing the coin from the die manually or by some semi-automatic means. As a result, production was limited to a range of from 3 to 5 pieces per minute.

A second drawback to the noted arrangement result from the means utilized to provide the feed mechanism dwell periods. As is inherent with most lost motion mechanisms, impact loading occurs at the end points of movement. Because the subject feed mechanism was operated at high rates, the impact loading become substantial and tended to produce many undesirable results. For example, it caused certain elements of the drive train to be subjected to successive wear and breakage. Further, the feed mechanism was brought into operation at a relatively high velocity which increased the chances of the coin blanks being dislodged from the feed mechanism. When such occurred, the resulting clashing of the dies damaged them beyond repair. Other disadvantages of the lost motion mechanism were a high noise level and substantial vibration.

Another feature of the noted feed mechanism which was somewhat undesirable was that it required a blank "transfer station." That is, the horizontal feed of the blanks from the feed tubes to the dies took place in two steps, with the blanks being transferred from one portion of the horizontal reciprocating feed mechanism to a second portion at a point intermediate the feed tubes and the dies. The mechanism required to make the transfer was quite critical in its adjustment and increased the chance that a blank would not properly be fed to the dies. Further, during the transfer, control of the blank was momentarily relinquished with the possibility that it would not be properly positioned on the second portion of the feed mechanism.

The present invention provides a press and feed mechanism of the general type described wherein the above and other disadvantages are overcome in a highly simplified manner. A press and feed mechanism formed in accordance with the invention allows the blanks to be automatically struck substantially any desired preselected number of times. Further, the innerconnecting drive train between the ram drive and the feed bar mechanism is arranged to provide positive mechanical dwell periods. The elimination of the lost motion mechanism results in a smooth, noiseless, and positive acceleration and deceleration of the feed bar. This results in decreased wear on the parts and substantially eliminates the possibility of a blank being dislodged from the feed bar. Additionally, the improved feed mechanism is arranged to get rid of the transfer station and its troublesome features and allow the blanks to be fed directly from the feed tubes to the dies in one smooth motion.

In accordance with one aspect of the invention, a press of the general type described is provided with an improved power take-off means interconnecting the ram drive and the blank feed mechanism. The improved means include first and second members mounted for independent oscillation about a common axis. The first member is continuously oscillated through a first connecting rod driven in timed relationship with the ram drive; whereas, the second member is continuously drivingly interconnected with the feed bar through means including a second connecting rod. And pawl means are provided for periodically drivingly interconnecting the first member with the second member following a predetermined number of cycles of the ram drive.

In accordance with a more limited aspect the first and second connecting rods are arranged to pass through their respective dead center points in a closely spaced time period, and a pawl means is arranged to interconnect the first and second members while the connecting rods are substantially in one of their dead center points and maintain them interconnected until they again reach the same dead center point.

By the use of the described power take-off mechanism, the feed mechanism is operated only after a predetermined number of press strokes. Consequently, by regulating the periods during which the pawl means is engaged, each blank can automatically be struck any number of times. Additionally, by arranging the first and second connecting rods so that they pass through their respective dead center points in closely adjacent points in time, distinct dwell periods are present in the motions supplied to the feed bar, thereby eliminating the previously required lost motion mechanism.

In accordance with another aspect of the present invention, a press having first and second coaxially aligned dies and means for imparting reciprocal movement to the first die relative to the second die is provided with improved means for feeding blanks from a blank head maintaining means positioned adjacent the dies to a located position on the second die. The improved means include a first horizontally reciprocated member having a blank receiving opening extending vertically therethrough and drive means for reciprocating the first member from a first blank receiving location wherein the opening is subjacent and aligned with the lowermost blank in the head maintaining means, to a second blank discharging location superjacent and aligned with the second die. Additionally, a second horizontally reciprocable member having a hold down portion continuously in engagement with the feed member is arranged to engage the blank in the opening as the feed member moves between the first and second positions. Drive means function to reciprocate the hold down member simultaneously with the first member and parallel thereto, throughout a path wherein the hold down portion engages the blank in the opening shortly after the opening has moved from its first position and stays in engagement therewith until the opening reaches the second position.

The provision of the reciprocated hold down member permits the previously used transfer station to be completely eliminated. Note that the second member engages the blank shortly after the blank is withdrawn from the head maintaining means and stays in engagement with the blank until the blank is deposited on the lower die.

A primary object of the present invention is the provision of a press and automatic feed mechanism therefor which is especially suited for coining operations.

A further object of the present invention is the provision of a press and automatic feed mechanism which allows a preselected number of press strokes to take place intermediate the feed strokes.

Yet another object of the present invention is the provision of a coining press having a highly simplified blank feeding mechanism.

A still further object of the present invention is the provision of a press wherein a drive train connected between the main press drive and the feed mechanism can be selectively engaged to produce feed strokes only after a predetermined number of press working strokes.

These and other objects and advantages will become apparent from the following description when read in connection with the accompanying drawings wherein:

FIG. 7 is a cross-sectional view taken on line 7—7 of FIG. 1 and shows the mechanism used to raise and lower the lower die in timed relationship with the actuation of the ram and the feed mechanism;

FIG. 9 is a view taken on line 9—9 of FIG. 8;

FIG. 10 is an end view partially in section of the mechanism shown in FIG. 9;

FIG. 11 is a cross-sectional view taken on line 11—11 of FIG. 8 and showing in detail one of the feed tubes and the reciprocable slide mechanism utilized for transferring blanks from the feed tube to the lower die;

Figure 1:
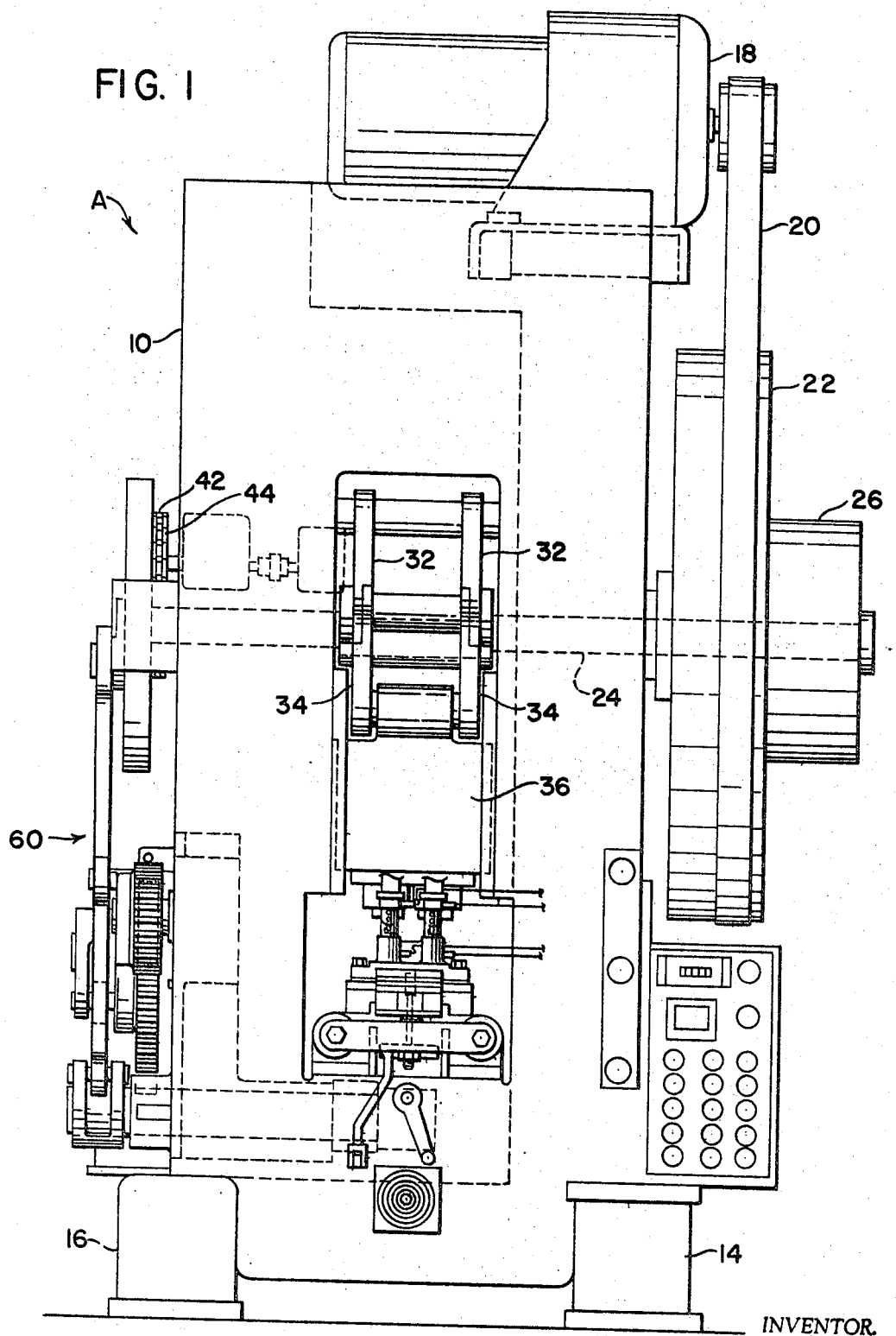
FIG. 1 is a front elevation of a preferred embodiment of a press and automatic feed mechanism formed in accordance with the present invention.
Figure 2:
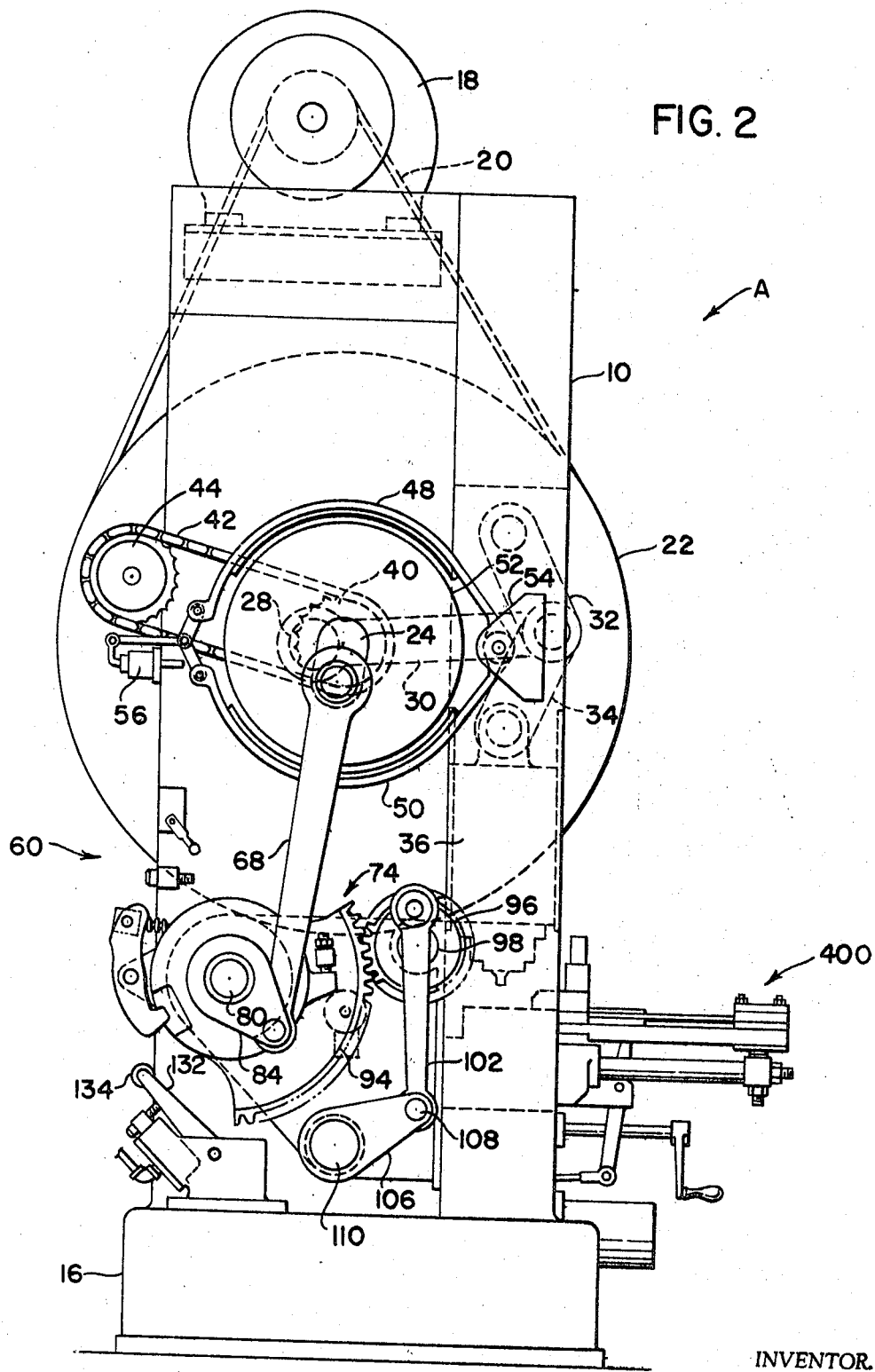
FIG. 2 is a left-side elevation of the press shown in FIG. 1.

Referring now to the drawings wherein the showings are for the purpose of illustrating a preferred embodiment of the invention only and not for the purpose of limiting same, FIGS. 1 and 2 show a knuckle-joint type press A including a main frame 10 supported from legs 14 and 16. The actual construction of the frame is not of importance to the present invention; however, it is shown as a one piece welded type frame formed from steel plates. A press drive motor 18 is suitably supported in any convenient manner from the top or crown of the press and is drivingly connected through a belt 20 with a flywheel 22. Flywheel 22 is rotatably mounted on a horizontally extending crankshaft 24 which is carried in suitable bearings in the press frame 10. A conventional clutch and brake mechanism 26 functions to selectively connect the flywheel to crankshaft 24 in a conventional manner to supply the rotational energy of the flywheel to the crankshaft. Crankshaft 24 includes an intermediate or throw portion 28 which is connected in a conventional manner to one end of a connecting rod 30. The other end of connecting rod 30 is pivotally connected to adjacent ends of knuckle joint links 32 and 34. The upper end of link 32 is pivotally connected to the upper or crown portion of the press, whereas the lower end of link 34 is pivotally connected to the slide or ram 36 which is arranged in conventional manner for guided vertical reciprocation in the press frame. The opposite end of crankshaft 24 carries a sprocket 40 which is drivingly connected through a roller chain 42 with a second sprocket 44 mounted at the back of the press. Sprocket 44 functions to drive various cam limit switches, timers and counters, and the like, used for controlling various press operations in timed relationship to the movement of the press ram. Additionally, for emergency stopping purposes the press includes an auxiliary brake including a pair of brake shoes 48 and 50 which are arranged to engage the outer periphery of a braking disc 52 which is keyed or otherwise positively connected to crankshaft 24. One end of the brake shoes 48 and 50 are pivotally mounted to the press frame by a bracket 54 whereas, the other ends are connected through a link mechanism with an air or solenoid type remotely controlled actuating mechanism 56.

Also connected to the left hand end of the crankshaft 24 is a power take-off or feed drive mechanism 60. The drive mechanism 60 functions to actuate the mechanism 300 (see FIG. 7) which raises and lowers the lower die in timed relationship with movement of the ram as well as, to drive the blank feed mechanism 500 (see FIGS. 8–15).

DRIVE MECHANISM 60

Figure 3:
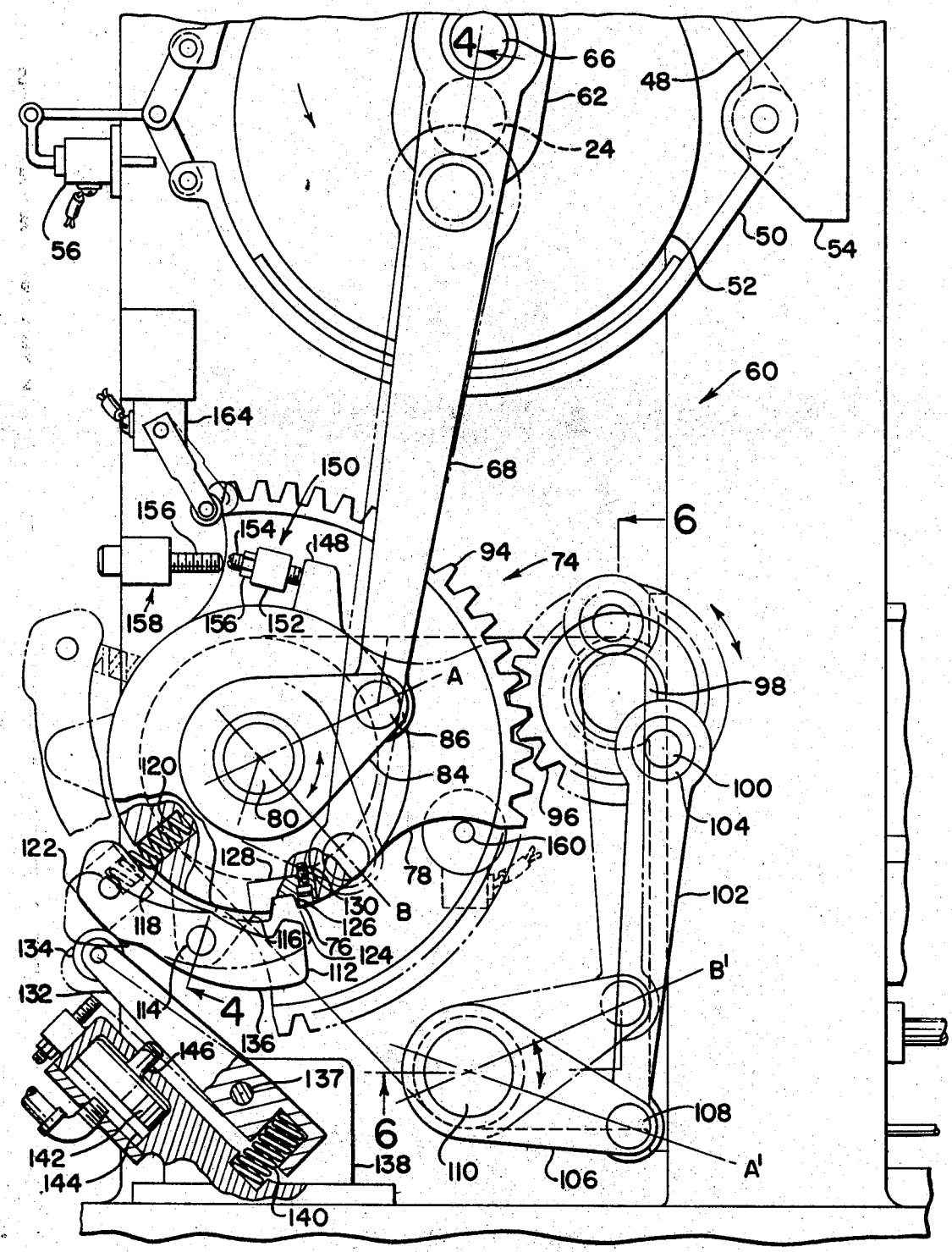
FIG. 3 is an enlarged partial elevational view of the power take-off and interconnecting drive train shown in FIG. 2.
Figure 4:
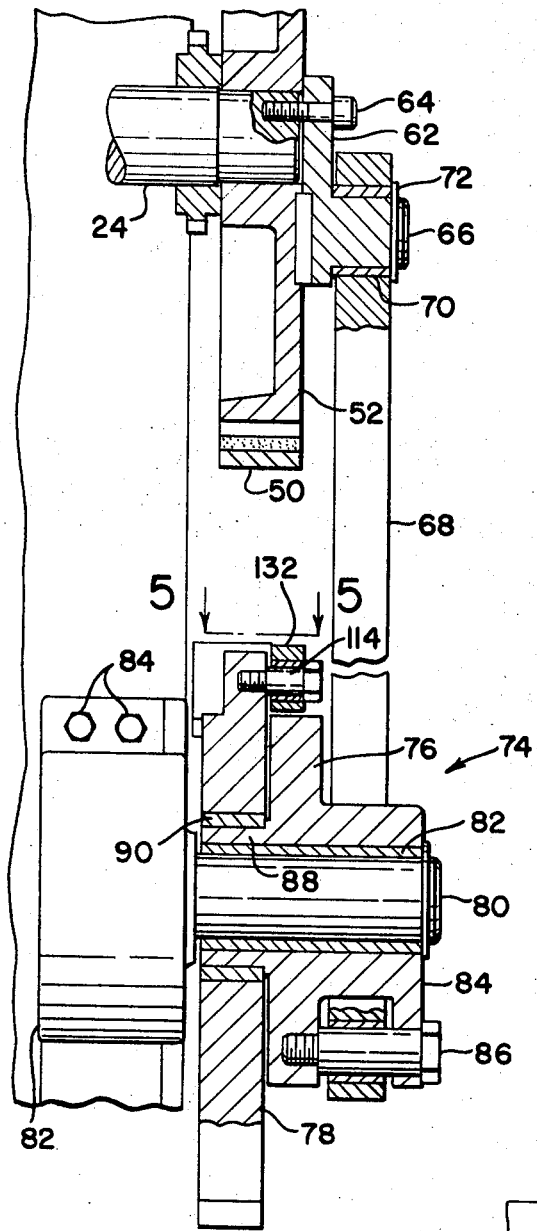
FIG. 4 is a view taken on line 4—4 of FIG. 3.

Referring to FIG. 3, the drive mechanism 60 will be described in detail. As shown, the drive mechanism 60 is directly driven from the end of the main crankshaft 24 and includes a crank arm 62 which is keyed to brake disc 52 and connected by a screw 64 to the outer end of crankshaft 24, as best shown in FIG. 4. Connected to the outwardly extending pin 66 of the crank 62 is a conventional connecting rod 68. The upper end of connecting rod 68 is provided with suitable bearings 70 and is maintained on portion 66 by any convenient means such as a snap ring 72. The lower end of connecting rod 68 is connected in driving relationship with a "skip stroke" mechanism 74.

Figure 6:
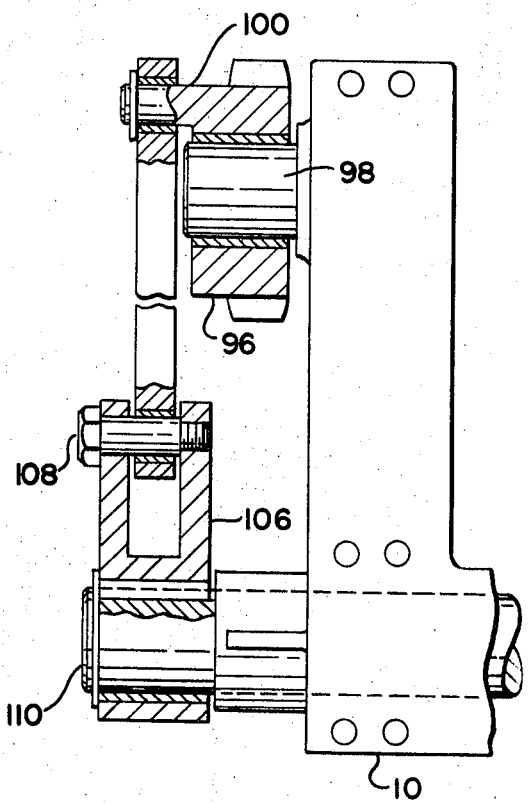
FIG. 6 is a cross-sectional view taken on line 6—6 of FIG. 3.
Figure 5:
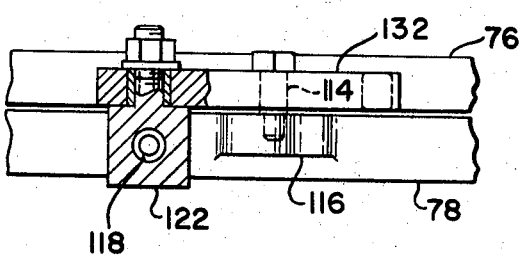
FIG. 5 is a partial cross-sectional view taken on line 5—5 of FIG. 4.

As best shown in FIGS. 3–5, skip stroke mechanism 74 includes first and second members 76 and 78 which are mounted for independent oscillation about a common axis defined by pin 80 which is mounted from a bracket 82 connected to the press frame 10 by a plurality of bolts or screws 84. As shown, member 76 is generally circular shape in shape and has a central bearing 82 which engages pin 80. A crank portion 84 extends outwardly from member 76 and is connected to the lower end of connecting rod 68 by a stud 86. As is apparent, rotation of the main press crankshaft 24 causes the member 76 to be oscillated between points a and b shown on FIG. 3. The second member 78 of skip stroke mechanism 74 is carried by a rearwardly extending portion 88 of the first member 76. Member 78 is provided with suitable bearings 90 which allow it to be freely oscillatable relative to portion 88. Extending outwardly from the right hand side of member 78, as viewed in FIG. 3, is a sector gear portion 94. Sector gear portion 94 is drivingly engaged with a pinion gear 96 which is mounted for rotation on a stud 98 which extends outwardly from the press frame. Pinion gear 96 carries an outwardly extending crank 100 to which is connected a connecting rod 102. The upper end of connecting rod 102 is provided with suitable bearings and is maintained on crank pin 100 by any convenient means such as a snap ring 104. The lower end of connecting rod 102 is connected to the end of a crank arm 106 by a wrist pin or stud 108. As best shown in FIG. 6, crank arm 106 is keyed or otherwise positively connected to a drive shaft 110 which extends horizontally into the press frame 10 and is rotatably carried therein by suitable bearings not shown.

Figure 8:
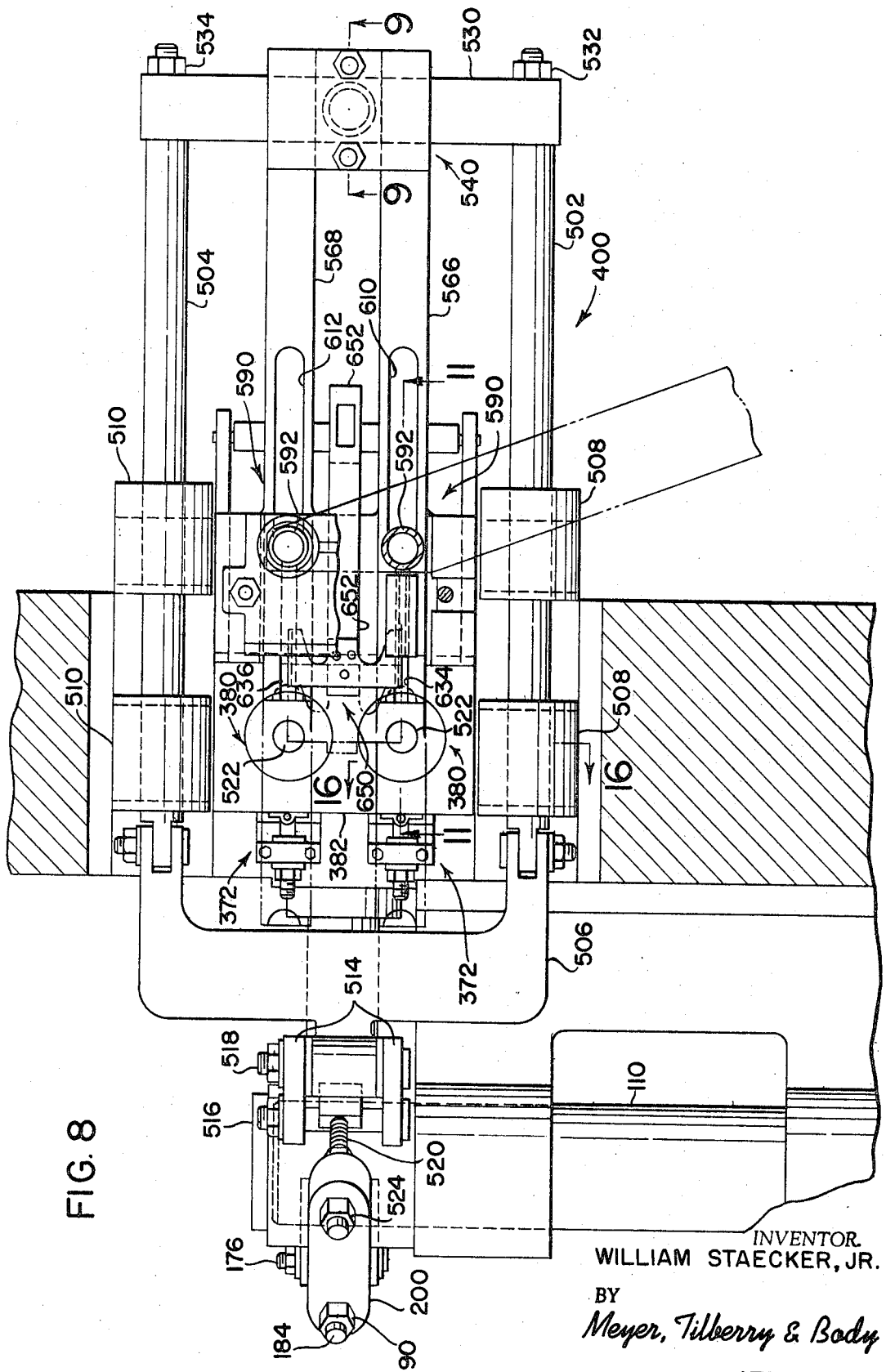
FIG. 8 is a cross-sectional plan view of the blank feeding mechanism taken on line 8—8 of FIG. 2.

The inner end of drive shaft 110 has a bell crank arm 200 connected thereto such as by keys 202 (see FIGS. 7 and 8). The opposite ends of bell crank lever 200 are respectively connected to the lower die with assembly 300 and the blank feed mechanism 400.

Referring again to FIGS. 2 through 6, it is seen that oscillation of shaft 110 will take place only when there is a driving connection between member 76 and 78 of skip stroke mechanism 74. In order to provide this connection at the proper time during the press cycle a pawl member 112 is pivotally connected by a pin 114 to a portion 116 which extends outwardly from member 78. As best shown in FIG. 3, pawl 112 is biased in a counterclockwise direction about pin 114 by a spring 118. One end of spring 118 is received in opening 120 which extends radially inward of member 78 while the other end engages a similar opening in a pivot block 122 connected to the left hand end of pawl 112. The right end of pawl 112 is provided with a portion 124 arranged to engage a recess 126 in member 76. As shown, recess 126 is formed in a hardened member 128 connected to member 76 by a screw 130. As can be seen, with pawl 112 engaged with member 76, oscillation of member 76 produces corresponding oscillation of member 78 thereby causing pinion gear 96 to be oscillated from sector gear 94 to produce a corresponding oscillation of drive shaft 110.

In order to provide for selective engagement and disengagement of pawl 112 so that the members 76 and 78 are engaged only after a selected number of press strokes, a lever 132 provided with a roller 134 is arranged to engage the back cam surface 136 of the pawl. As shown, lever 132 is pivotally mounted by a pivot pin 137 carried on a bracket 138 connected to the press frame 110. Lever 132 is continually biased into a counterclockwise direction by a spring 140. Accordingly, with this lever 132 in the dotted line position, the roller 134 will be disengaged from the camming surface 136 of pawl. 112 permitting spring 118 to rotate pawl 112 counterclockwise into engagement to provide a driving connection between members 76 and 78. However, when it is desired to cause disengagement of the pawl, means are provided to rotate the lever 132 clockwise so that roller 134 engages the cam surface 136 of the pawl and causes the pawl to be rotated clockwise against the bias of spring 118 to the position shown in FIG. 3. Accordingly, with the pawl disengaged the member 76 is freely movable relative to member 78 and driving forces are not transmitted to member 78.

A variety of means can be utilized for selectively rotating lever 132; however, in the preferred embodiment these means include an air piston 142 which is carried in a cylinder 144 formed in member 138. Piston 142 has a portion 146 which extends outwardly into engagement with lever 132. By controlling the supply of air pressure behind piston 142 the movement of lever 132 and the engagement and disengagement of the pawl 112 is accomplished. Any of a variety of mechanisms could be used for controlling the air pressure. For example, limit switches carried on the main press crank 66 could control a counter actuated solenoid valve for allowing air to be supplied to cylinder 144 during a predetermined number of press cycles.

Since the time of oscillation of the mechanism is extremely short, and since it takes time for the piston 142 to react, the actual disengagement of pawl 112 must begin before the sector gear has reached its final upper position shown solid in FIG. 3. In order to provide for the final drive movement of the sector gear to its upper position, a driving lug 148 extends outwardly from member 76 and is arranged to engage an adjustable stop member 150 which extends from member 78. As shown, adjustable stop 150 includes a bracket portion 152 provided with a threaded opening in which is received a threaded stud 154. Stud 154 is locked in its adjusted position by a nut 156. To prevent over-travel of the member 78 due to inertia forces, an adjustable stop 158 extends outwardly from the press frame 110 and includes a threaded stud 156 which engages the sector gear portion of the member 78 to limit its counterclockwise movement. Additionally, to prevent any clockwise movement of the sector gear except in response to movement of the member 76 an anti-back-up plunger 160 is actuated outwardly under the sector gear to effectively lock the sector gear in an all-out position. Plunger 160 could be controlled in a variety of ways, however, it is shown as a solenoid actuated plunger and is controlled in timed relationship with the movement of the main press crank through limit switches not shown.

The position of the sector gear is continuously monitored by a pair of limit switches 164 (only one switch is shown, however a second switch is positioned directly behind the one shown). These switches are arranged in the press control circuit so that unless they are actuated at the proper time during the machine cycle the machine will be automatically stopped.

An important feature of drive mechanism 60 is the arrangement whereby a distinct mechanical dwell is produced in the motion of shaft 110. As previously discussed, this mechanical dwell is required in order to provide proper motion to the blank feed mechanism. In order to provide the required dwell without the use of lost motion type connections, the present invention arranges the connecting rods 68 and 102 so that they both pass through their dead center positions at a closely spaced timed interval. Because of this, there is a distinct dwell in the movement of shaft 110 at the opposite ends of its oscillation.

Connected at the inner end of shaft 110 as best shown in FIGS. 7 and 8, is previously mentioned crank arm 200. The lower end of crank 200 is connected through an adjustable link assembly 170 with the lower die lift up mechanism 300 whereas the upper end of bell crank 200 is connected through a similar adjustable link assembly 172 with the blank feeding mechanism 400. As shown, the assembly 170 comprises a first link member 174 which is pivotally connected to the bell crank 200 by a bolt 176. The lower end of link 174 is connected through a second bolt 178 with a second link member 180 which is in turn connected by a bolt 182 with a plunger 304 of the lower die lift-up assembly. The link assembly 170 is arranged for adjustment relative to the bell crank arm by an adjusting screw 184 which has one end connected by a clevice 186 and a screw or bolt 188 with the mid-point of link 174. As shown in FIG. 8, the opposite end of bolt 184 extends through bell crank member 200 and is attached thereto by a pair of nuts 190. This arrangement allows the position of the link assembly to be adjusted to provide a fine adjustment of the position of plunger 304 of the lower die lift-up mechanism.

LOWER DIE LIFT-UP MECHANISM

The lower die lift-up mechanism 300 is shown in detail in FIGS. 7 and 11. The mechanism includes a cylindrical sleeve 304 which extends horizontally through press frame 10 and slidably receives plunger 304. Sleeve 302 is secured to frame 10 by means of key plates 306 and 308 received in slots at the opposite ends of the sleeves. The key plates 306 and 308 are releasably secured to frame 10 in any convenient manner, such as by machine screws 306a and 308a. A protective cylindrical sleeve 310 is suitably mounted to key plate arrangement 308, as by welding, so as to coaxially surround sleeve 302, as shown in FIG. 7. Consequently, as plunger 304 is reciprocably displaced between the positions shown by the solid lines and dotted lines, respectively corresponding with position A and B of pivot arm 60, no damage will result to the plunger by virtue of obstructing exterior objects and the like.

Plunger 304 is provided with an upwardly opening cavity 312 intermediate its end. An adjustable wedge block assembly 314 comprising a wedge 316 and a cam block 318 is positioned within cavity 312. As shown, wedge 316 includes a flat surface 320 in frictional, slidable engagement with a corresponding flat surface 322 of plunger 304 at the bottom of cavity 312. The opposite surface 324 of wedge block 316 is tapered relative to surface 320 and frictionally engages a similarly tapered surface 326 on the bottom side of cam block 318. The top side of cam block 318 is formed with a cam surface 328. Blocks 330 and 332, secured to the plunger 304 as by screws 334 and 335, engage the opposite ends of cam block 318 and prevent it from being moved axially relative to the plunger. Cam block 318 is also resiliently held in place on the tapered surface 324 of wedge block 316 by means of spring clips 336 and 338, respectively, secured to block 330 and 332 by means of screws 334 and 335. As is apparent, the ends of spring clips 336 and 338 are in resilient engagement with the top or cam surface 328 of cam block 318 providing a downwardly directed bias force as viewed in FIG. 7, to resiliently maintain cam block 318 in place on wedge block 316.

A shaft 340 is threaded axially through plunger 304 into the cavity 312 and extend into a threaded opening in wedge block 316. The other end of shaft 340 extends axially outward from one end of plunger 304. Any convenient tool receiving means, such as a slot or the like, are provided on the outer end of shaft 340 so that it can be rotated to slidably displace wedge block 316 axially of plunger 304 thereby causing a corresponding vertical adjustment of cam block 318. Adjustments of this nature may be required due to slight inaccuracies present in lift-up mechanism 300, as well as wear of cam surface 328 with extended use. A lock nut 342 is threaded to the end of shaft 340 for axially locking the shaft to prevent accidental axial displacement of wedge block 316.

The cam surface 328 of cam block 318 includes, from left to right, a horizontal portion 344 merging into an inclined portion 346 followed by a relatively short horizontal or flat portion 348 elevated relative to portion 344 and a drop off portion 350.

A lift-up shaft 352 is mounted for reciprocal guided movement in a passage 354 extending vertically upward through sleeve 302 and press frame 10. Passage 354 terminates in a recess 356 in bed surface 358 of frame 10. A dog 360 is pivotally mounted to the bottom end of lift-up shaft 352 in a cutaway portion 362 of the shaft by means of a pivot pin 364. A spring 366 is interposed between an upwardly extending flange portion 368 of dog 360 in a shoulder of the shaft 352 and serves to resiliently bias flange portion 368 of dog 360 into frictional engagement with the walls of passage 354.

As is apparent, displacement of plunger 304 toward the right, as viewed in FIG. 7, by virtue of bell crank arm 200 being displaced from position a to position b, causes dog 360 to ride up the incline surface portion 346 of cam block 318, momentarily dwell as it is in the engagement with flat surface 348 and, thereafter, ride down drop-off portion 350. As the plunger 304 is displaced to the left and returned to the position shown in FIG. 7, dog 360 pivots in a clockwise direction when engaged by drop-off portion 350 so as to thereby prevent lift-up shaft 352 from being displaced vertically upward. The extent of upward vertical displacement of lift-up shaft 352 is, of course, determined by the height of the flat surface portion 348 relative to the horizontal surface portion 344 of cam block 318. As previously mentioned, adjustment of the extent of vertical displacement of lift-up shaft 352 may be accomplished by rotating shaft 340 to shift the horizontal position of wedge block 316. Additionally, finer adjustment can be accomplished by adjusting microadjustment assembly 70 as desired.

A lift-up plate 368 is secured to the upper end of lift shaft 352 and is received by recess 356 in the press bed surface 358 of frame 10. Plate 368 is arranged to engage the lower ends of lower die lift studs 370.

Although not shown, it is to be understood that there are two die lift studs 370 spaced horizontally and positioned under each of the two dies. As best shown in FIGS. 11 and 17, the upper ends of the studs 370 are arranged to engage an adjusting wedge assembly 372 and act therethrough to move the lower die vertically upward at the proper time during the machine cycle. The adjusting wedge mechanism 372 includes upper and lower wedge members 374 and 376 respectively. Additionally, means, not shown, are provided for adjusting the position of the upper wedge member 374 relative to wedge member 376 to provide an adjustment for the position of the lower die. Although the mechanism for performing this adjustment is not shown it is to be understood that the arrangement is preferably as shown in the previously mentioned U.S. patent to Kraft et al. 3,283,551. Additionally, though not shown, it is to be understood that the separate adjusting wedge assemblies 372 are provided for each of the lower dies.

The lower die assemblies 380 are identical in construction and, accordingly, only one will be described in detail; however, it is to be understood that the description of one is equally applicable to the other.

Referring specifically to FIG. 17 it is seen that the lower die assembly 380 includes a lower die block 382 which is secured to the bed of the press in any convenient manner. The die block 382 is provided with a pair of die receiving cavities 384 which receive and contain the lower dies 386. Each lower die 386 includes a tapered shoulder 388 which terminates in a lower cylindrical base portion 390 as best shown in FIG. 17. An annular alignment collar 392 surrounds lower die 386 and is provided with a tapered inner opening 394 which rests on the tapered shoulder portion 388 of the die 356. As the lower die 386 and the collar 392 are axially displaced in a vertical direction under the influence of the push rods 370, the outer annular surface 394 of the collar 392 slides in the opening 384 to guide the upward movement of the die. An annular ring 396 coaxially surrounds the lower die 386 at its cylindrical neck portion 398. Ring 396 is prevented from being injected vertically upward from die receiving cavity 384 by means of an annular shoulder 400 which mates with an overlapping end or shoulder 402 of die block 382. A plurality of compression springs 404 are interposed between ring 396 and collar 392 and serve to resiliently bias the lower die downwardly. Accordingly, when the push rods 370 are in their lowermost position the die 386 is moved downwardly and, in combination with collar 396 declines a blank receiving well 406.

The upper dies 410 are suitably secured at their cylindrical base portions 412 to slide 36 by suitable die holding mechanism 414 so as to be respectively coaxially aligned with the lower dies 386. The upper dies 410 are identical, and, as shown in FIG. 11, each includes a cylindrical neck portion 416 which has a diameter equal to that of the cylindrical neck portion 398 of the lower dies 386. Lower dies 386 are also identical and include a die face 418 provided on the upper end of neck portion 398 which faces a die face 420 on the end of neck portion 416 of upper die 410. The die faces 418 of lower dies 386 are, during the coining portion of the press cycle, positioned slightly lower than the top surface 442 of die block 382 and define, together with the inner circumferences of rings 396, a pair of recesses or die cavities 422. With this construction a suitable coin blank 425 may be placed in each of the die cavities 422 whereupon as upper dies 410 are lowered to their coining positions, as shown in FIG. 11, the blanks 425 undergo severe coining pressures and become finished coins.

Lower die lift-up mechanism 300 also includes a hand crank mechanism 430, shown in FIG. 7, for purposes of enabling an operator to manually apply forces to lift the lower dies 386 vertically upward, so that, for example, the die faces 316 of lower dies 386 may be wiped clean with a cloth. Hand crank mechanism 430 includes an L-shaped handle 432 positively connected in any convenient manner to one end of a cylindrical elongated shaft 434 which extend horizontally inward through press frame 12. The inner end of cylindrical shaft 434 has a portion cut away to form a cam 436 adapted to cam against the underside of lift plate 368. As is apparent, as cam 436 rotates against the underside of lift-up plate 468 the plate 368 is moved vertically upward and engages and vertically lifts the lift-up studs 370.

FEED MECHANISM 500

The means for feeding the coin blanks to a position between the upper and lower dies, and discharging them following the coining operation comprises a horizontally reciprocated feed mechanism 500 shown in detail in FIGS. 7 through 15. Referring specifically to FIGS. 7 and 8, it is seen that the feed mechanism includes a pair of parallel slide rods 502 and 504. Each of rods 502 and 504 are pivotally connected at one end to a leg portion of a coupling member 506. The rods 502 and 504 are slidably received by guides 508 and 510 respectively which extend upwardly from a frame 512 suitably secured to the press frame 10. The rods 502 and 504 are reciprocated in timed relationship with the movement of the ram 36 by being connected through coupling member 506 and adjustable link mechanism 172 with the bell crank member 200.

As best shown in FIG. 7 the adjustable link mechanism provides means for adjusting the position of member 506 relative to the bell crank 200. As shown, adjustable link mechanism 172 includes a link member 514 which is pivotally connected at its lower end via a bolt 516 with the upper end of the bell crank arm 200. The upper end of link 514 is pivotally connected to member 506 by a bolt 518. The means for adjusting the position of the link relative to the crank arm comprises a bolt 520 which is pivotally connected at one end to the link 514 by a bolt 522. The other end of bolt 520 passes through an opening in bell crank 200 and is adjustable relative thereto by a pair of nuts 524.

Connected to the opposite ends of rods 502 and 504 is a horizontally extending member 530 which is suitably secured to the end of the rods such as by nuts 532 and 534. As best shown in FIG. 8 a connector block and slide assembly 540 is mounted centrally of member 530. As best shown in FIGS. 7, 9 and 10, assembly 540 is arranged for horizontal sliding movement on a pair of guide bars 542 and 544 which are suitably connected to the press. Referring to FIGS. 9 and 10, the assembly 540 includes a first slide member 546 which is positioned between guide members 542 and 544 and is drivingly connected with the horizontally extending member 530 by a vertical pin 548 which is received in a central opening 550. The pin is suitably secured to the member 530 by a threaded stud portion 552 which extends downwardly through the member 530 and is connected thereto by a nut 554.

A plate 556 extends horizontally across the bottom of guide bars 542 and 544 and is connected to the slide member 546 by a pair of machine screws 558. A second plate member 560 extends across the upper surface of the guide bars and the slide member 546. Plate 560 includes a slot 562 in which is positioned a key plate 564. A pair of feed fingers 566 and 568 (see FIG. 8) are received on the upper surface of plate 560 and arranged to extend horizontally outwardly from the clamp and guide block assembly 540. Fingers 566 and 568 include inwardly extending slots which receive key plate 564. The feed fingers are clamped in the assembly by a pair of first clamp plates 570 and 572 and a top plate 574. Vertically extending studs 578 pass downwardly through the assembly and are threadedly connected to slide block 546. The studs include an enlarged collar portion 580 which engages the upper surface of plate 560 and firmly clamps it to guide block 546. Nuts 582 are positioned on the outer ends of studs 578 to hold and clamp the clamp members 572 and 574 in position.

Figure 12:
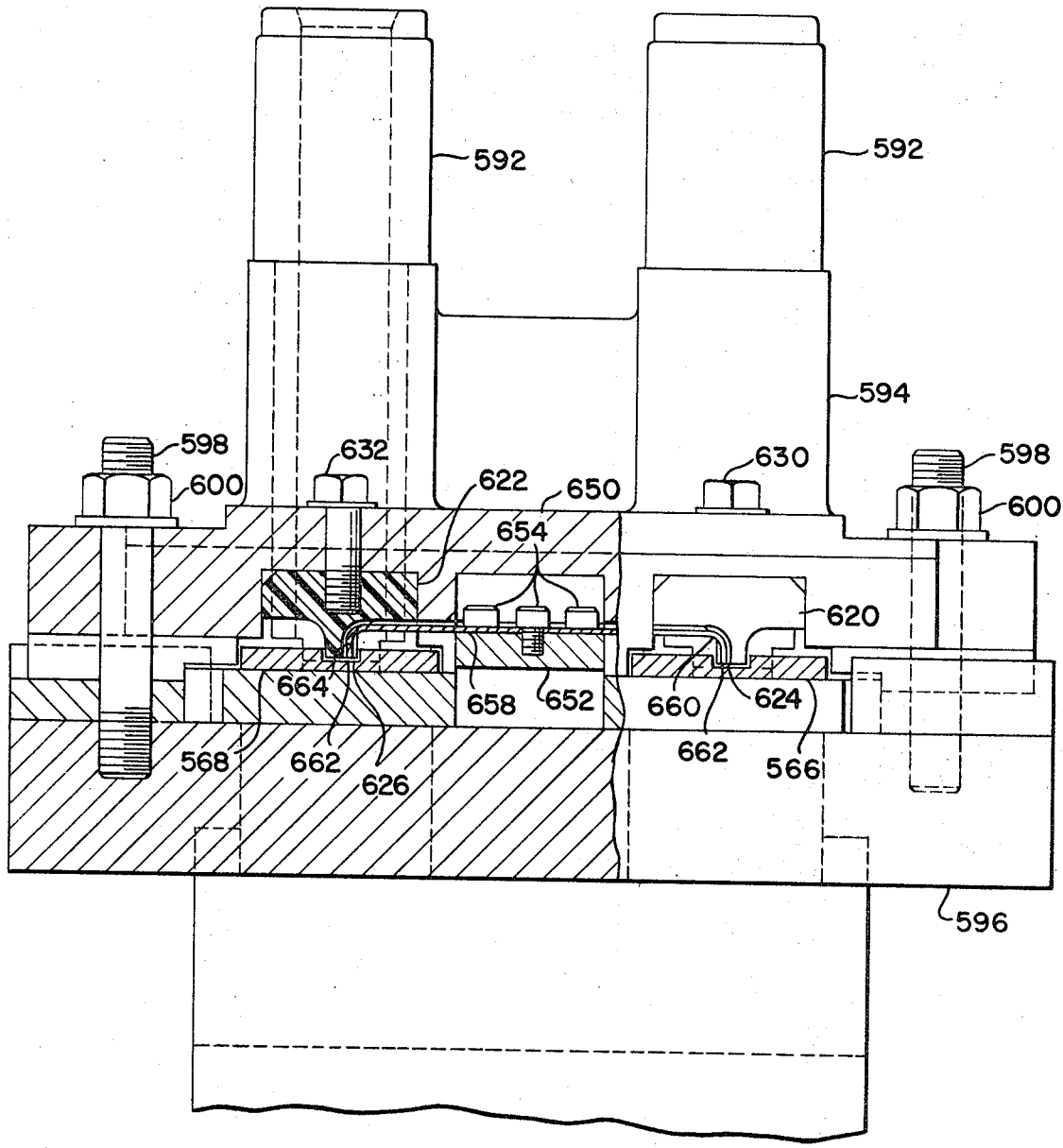
FIG. 12 is a cross-sectional view taken on line 12—12 of FIG. 11.

Referring specifically to FIG. 8, it is seen that the feed fingers 566 and 568 extend horizontally toward the press in side-by-side parallel relationship. The feed fingers are arranged so as to take coin blanks from the blank head maintaining means 590 and move them horizontally to a located position in the die wells 422, while simultaneously ejecting the finished coins from the dies. Referring specifically to FIGS. 11 and 12, it is seen that the head maintaining means include a pair of vertically extending tubes 592 which are carried in a frame 594 connected to the feed table 596 by a pair of studs 598 and nuts 600. As shown in FIG. 11, the tubes 592 have an opening 602 of a diameter to closely receive a plurality of coin blanks 425 and maintain them vertically aligned over each of the respective feed fingers 556 and 558. Any of a variety of means could be utilized to supply the necessary coin blanks to the open upper ends of the tubes 592. For example, the means for supplying the blanks to the tubes would preferably comprise a hopper and feed tube arrangement such as shown in previously discussed U.S. Pat. 3,283,551.

Figure 13:
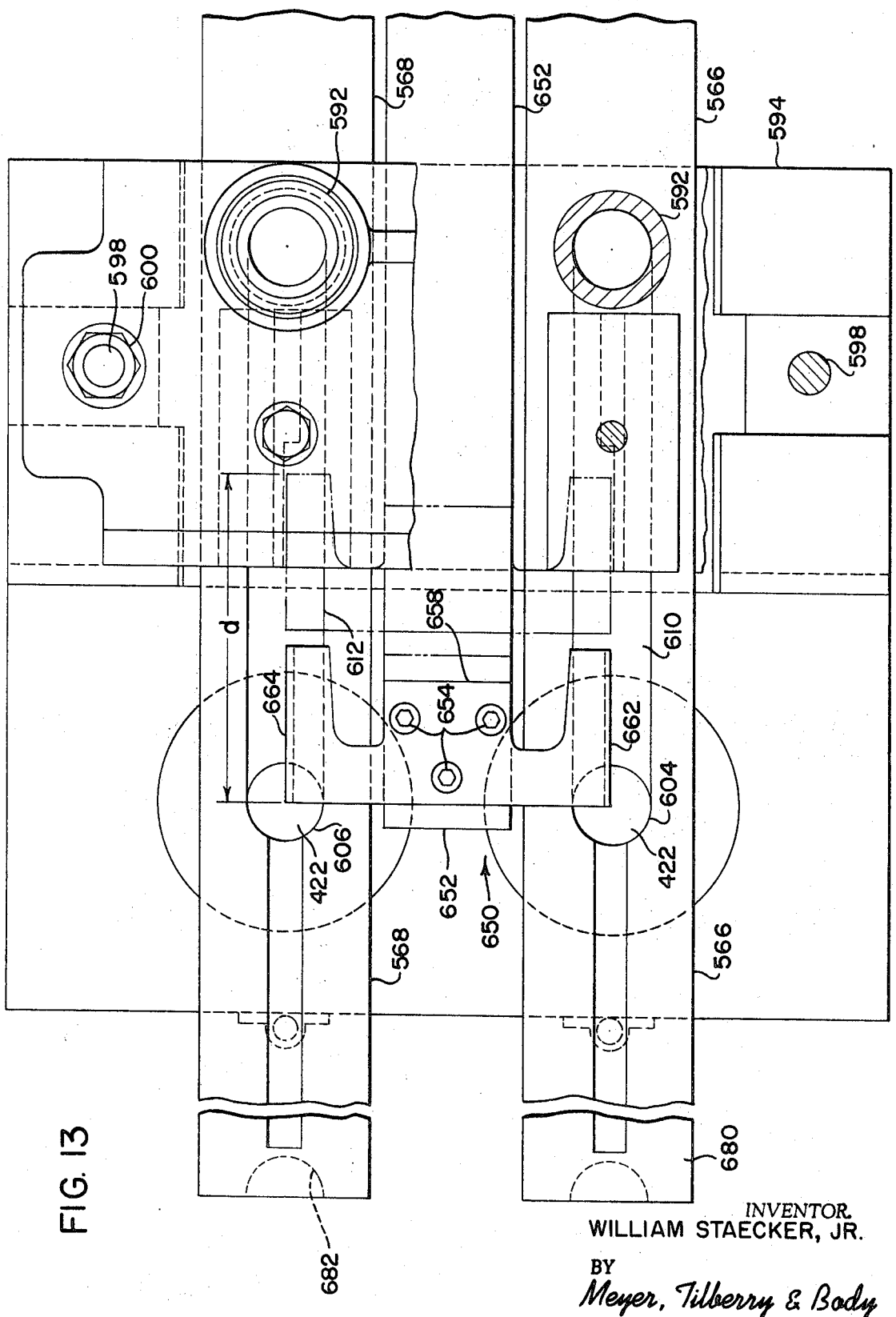
FIG. 13 is a cross-sectional plan view taken on line 13—13 of FIG. 11.

As shown in FIGS. 12 and 13, the feed fingers 566 and 568 are arranged to be reciprocated directly beneath the lower ends of the feed tubes 592. As shown, each of the feed fingers includes a coin blank receiving opening 604 and 606 respectively which extends vertically through the feed fingers. Openings 604 and 606 are arranged so that when the feed fingers are in their outward limit of movement the openings are axially aligned with the feed tubes 592 and a blank is deposited in the openings. As the feed fingers are then reciprocated into the press the openings come to a position axially aligned with the die wells 422 and the blanks are deposited therein. Referring to FIG. 13, it is seen that the feed fingers also each have a longitudinal groove 610 or 612 respectively formed in the upper surface. The grooves 610 and 612 extends downwardly into the feed fingers to a depth sufficient to make the resulting thickness of the feed finger in that portion slightly less than the thickness of the coin blanks.

As is apparent, means must be provided to maintain the coin blanks in the openings 604 and 606 as the feed fingers are reciprocated inwardly. Due to the high velocity of movement of the feed finger the blanks would be likely to jump out of the openings if some positive means were not provided to hold them down. In the past, a complicated transfer feed station was positioned intermediate the head maintaining means and the die openings. This transfer station functioned to transfer the coin blanks from a first position on the feed finger to a second position wherein a spring biased hold down finger engaged its upper surface. As previously discussed this transfer station was relatively complicated and required extremely fine adjustment. The present invention overcomes these problems by providing a unique improved hold down arrangement. Referring specifically to FIGS. 11 and 12, it is seen that as the feed fingers 566 and 568 are reciprocated inwardly to move a coin blank into position in the die wells, the blank in each respective feed finger passes under a non-metallic hold down member 620 or 622 respectively. The hold down members 620 and 622 are arranged so as to have respective lower surfaces 624 and 626, which engage the top surface of the coin blank in its respective feed finger. The members 620 and 622 are positively fixedly mounted in the frame 594 by screws 630 and 632. Additionally, the feed fingers 566 and 568 each have respective longitudinally extending grooves 634 and 636 formed in their forward ends. These grooves are arranged to permit the lower portions of the hold down members 620 and 622 to extend downwardly into the feed fingers to a position where their lower surface can engage the top surface of the blanks and the respective feed fingers.

As shown in FIG. 11 the hold down member 610 from a point closely adjacent the feed tubes 592 to a point substantially midway between the feed tubes and the dies. When the coin blanks have been moved to the outer end of the hold down members additional means are provided to engage the blanks and hold them in position in the feed fingers until they are deposited in the die. These means include a horizontally reciprocated hold down member which is driven in timed relationship with the movement of the feed fingers. As best shown in FIGS. 8, 12 and 13, member 650 includes an elongated bar 652 which is slidably mounted in frame 594. Mounted at the outer end of the bar 652 and connected thereto by a plurality of machine screws 654 is a resilient transversely extending hold down member 658. As shown in FIG. 12, the hold down member 658 has its opposite ends 660 and 662 bent downwardly so as to have a lower hold down surface 664 and 666 respectively positioned at the same elevation as the lower surfaces of the hold down members 620 and 622. Additionally, the respective ends of the hold down member 658 have a longitudinal extent substantially greater than the diameter of the coin receiving openings 604 and 606. As shown, the member 652 is reciprocated a distance D shown on FIG. 13. Accordingly, as the coin blanks are moved outwardly from their original position beneath the lower ends of tubes 592 they are first engaged by their respective hold down member 620 and 622 and held in position by this member until they reach approximately the mid-point between the tubes and the dies. Thereafter, they are engaged by the hold down member 658. This member is reciprocated inwardly simultaneously with the reciprocation of the feed fingers but at a different velocity.

The outer ends of the feed fingers 566 and 568 are provided with a respective coin receiving recess 680 and 682. These recesses are arranged so as the feed fingers are reciprocated forward during a feed stroke the previously formed coin resting on the raised lower dies are ejected therefrom. Consequently, a single movement of the feed fingers both ejects the previously finished coin and supplies a new blank to the die wells.

Figure 14:
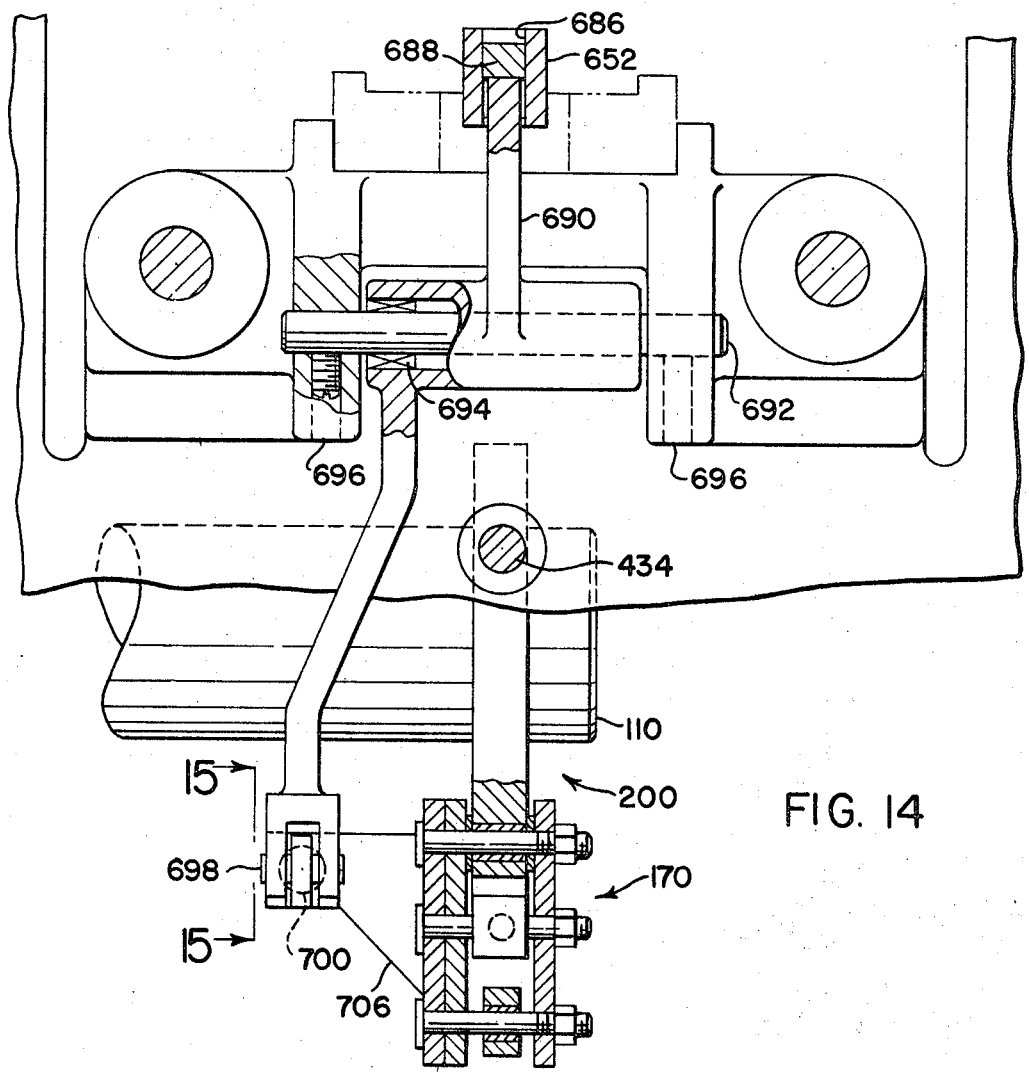
FIG. 14 is a cross-sectional view taken on line 14—14 of FIG. 7.
Figure 15:
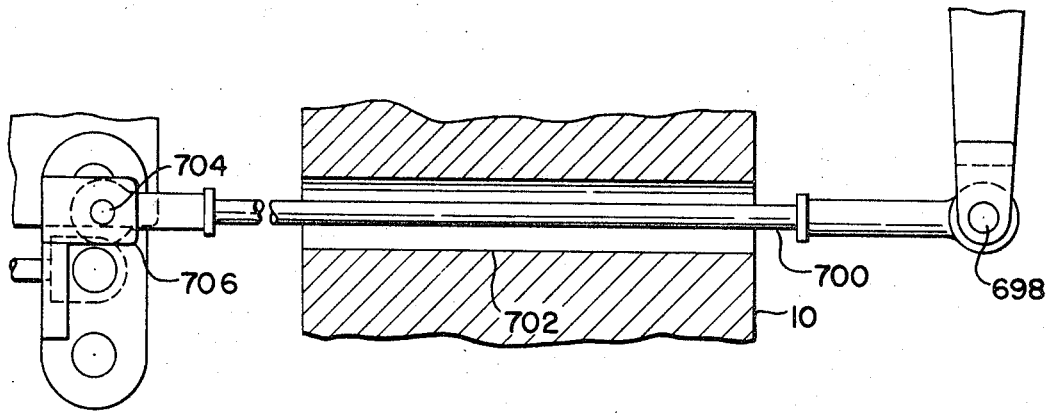
FIG. 15 is a view taken on line 15—15 of FIG. 14.
Figure 16:
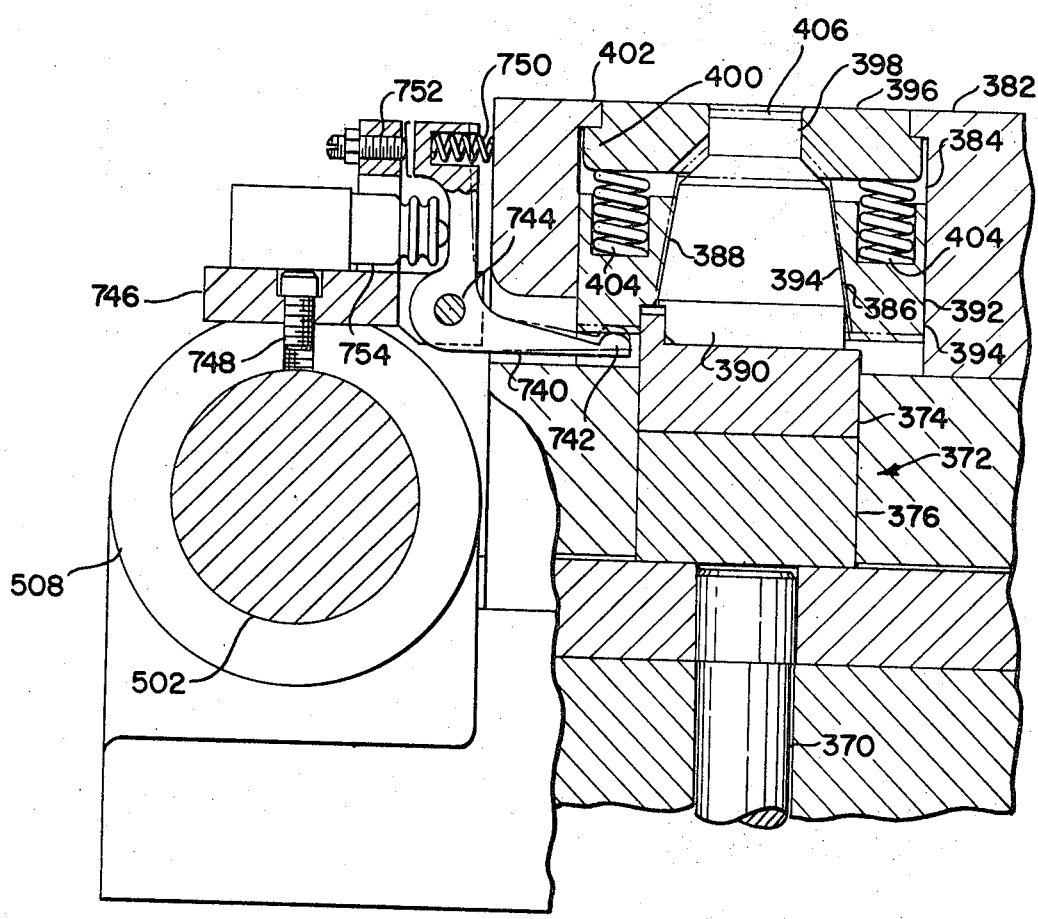
FIG. 16 is a cross-sectional view taken on line 16—16 of FIG. 7 showing in detail the construction of one of the lower dies and the arrangement utilized for sensing the presence of a "no-well condition."

The means for driving the hold down member 650 could take a variety of forms; however, the preferred drive means is as shown in FIGS. 7, 14, and 15. Referring specifically to FIGS. 7 and 14 it is seen that the outer end of member 652 is provided with a vertically extending opening 686. A slide block 688 is closely received in the opening and connected through a ball joint with the upper end of a lever 690. Lever 690 is mounted on a pin 692 by suitable bearings 694. Pin or shaft 692 is carried by outwardly extending bracket arms 696. The lower end of lever 690 is pivotally connected through a pivot pin or bolt 698 with a horizontally extending shaft or rod 700. As best shown in FIGS. 14 and 15, rod 700 extends through a suitable opening 702 formed in frame 10 and is pivotally connected through a pin or bolt 704 and a bracket portion 706 with the adjustable link assembly 170. Referring to FIG. 7, it is seen that this arrangement causes the member 652 to be oscillated in timed relationship with the movement of the press and the movement of the feed fingers. Additionally, by the combined arrangement of the feed fingers and the reciprocated hold down members the previously required transfer station and its problems are completely eliminated and the coin blanks are supplied and discharged from the dies in one smooth movement.

As previously discussed, the lower dies 386 must be moved downwardly to form the die well 422 prior to the time that the coin blank is moved thereover. If such a well is not formed the coin will not be positioned properly on the lower die and the resulting product will be improperly formed. Alternately, if the lower die is not moved to its lowered well forming position the blank will simply be reciprocated back with the result that the dies will clash together on the subsequent downstroke of the ram. Because of the clash, the dies will be damaged substantially beyond repair. The lack of a well being formed is normally caused by the cylindrical neck portion 398 of the lower die expanding and seizing in the collar 396. In order to prevent the ram from moving down if this happens, the present invention provides a unique arrangement for sensing the presence of a "no well" condition.

Referring specifically to FIG. 17 it is seen that a lever 740 extends inwardly from the side of the die housing to a position wherein its inner ends 742 is subjacent the lower surface of the die collar 392. The lever 740 is pivotally mounted by a pivot pin or bolt 744 which is carried on a bracket 746 connected to one of the guide bearings 508 by a screw 748. A compression spring 750 is positioned between the upper end of the lever 740 and the die housing and maintains a continual counterclockwise bias against the lever. Accordingly, the end 742 of the lever is maintained in continuous engagement with the lower surface of the die collar 392. Adjustable screw 752 is provided to limit the counterclockwise movement of the lever. As is apparent, when the die collar is in its upper position indicating that the die is in a raised or "no-well" position, the lever will be pivoted clockwise into engagement with the adjusting screw 752; however, when the collar is in its lowered position indicating that a well has been formed the lever is pivoted clockwise against the bias of the spring.

A variety of means could be utilized for sensing the position of the lever and in turn sensing whether or not a well has been formed; however, as shown a limit switch 754 is arranged to engage the upper arm of lever 740. This switch is connected into the press control circuit so as to prevent the ram 36 from being driven downwardly except during a period when a die well has been formed. Accordingly, it is not possible for the dies to come together except during a period when a well has been formed.

The invention has been described in great detail sufficient to enable one of ordinary skill in the art to make and use the same. Obviously, modifications and alterations of the preferred embodiment of the invention will occur to others upon a reading and understanding of the specification, and it is my intention to include all such modifications and alternations as part of my invention insofar as they come within the scope of the appended claims.

Having thus described my invention, I claim:

1. In a press including a ram and an aligned die, rotary drive means for reciprocating said ram toward and away from the die, and reciprocated feed means for positioning workpieces between said ram and said die, an improved power take-off interconnecting the drive means and the feed means, said power take-off means including first and second drive members mounted for independent oscillation about a common axis, a first connecting rod connected between said rotary drive means and said first drive member for continuously oscillating said first drive member, a second connecting means continuously connecting the second member to the feed means, and pawl means for periodically drivingly interconnecting the first member with the second member following a predetermined number of cycles of the rotary drive means.

2. The improvement as defined in claim 1 wherein said second connecting means includes a second connecting rod.

3. The improvement as defined in claim 2 wherein said first and second connecting rods are arranged to pass through their respective dead centers in closely spaced time periods.

4. The invention as defined in claim 2 wherein said pawl means is arranged to interconnect said first and second members while said connecting rods are substantially in one of their dead center points.

5. In a press including a ram and an aligned die, rotary drive means for reciprocating said ram toward and away from said die and reciprocated feed means for positioning workpieces between said ram and said die, the improvement comprising power take-off drive means interconnected between said rotary drive means and said feed means, said power take-off drive means including means for actuating said feed means only after at least two reciprocations of said ram and means for energizing said actuating means at any desired time following said at least two reciprocations.

6. In a press having first and second coaxially aligned dies and means for imparting reciprocal movement to the first die relative to the second, improved means for feeding blanks from a blank head maintaining means adjacent the dies to a located position on the second die, said improved means including a first horizontally reciprocated member having a blank receiving opening extending vertically therethrough, first drive means for reciprocating the first member from a first blank receiving location wherein the opening is subjacent and aligned with the lowermost blank in the head maintaining means to a second blank discharging position superjacent and aligned with the second die, a second horizontally reciprocable member having a hold down portion continuously with the first member and arranged to engage a blank in said opening; and, second drive means for reciprocating said second member simultaneously with said first member and throughout a path wherein the hold down portion engages a blank in said opening shortly after the opening has moved from its first position and stays in engagement therewith until the opening reaches said second position.

7. In a press having first and second coaxially aligned dies and prime mover means for imparting reciprocal movement to said first die toward and away from said second die in repeating press cycles, said second die including means for moving it toward and away from the first die between a first position for receiving a workpiece and a second position for discharging a workpiece, the improvement comprising sensing means responsive to the position of said second die for stopping said prime mover if said second die is in said second position as said first die is moving toward said second die.

8. The improvement as defined in claim 7 wherein said second die has a movable collar positioned thereabout and movable therewith, and said sensing means includes a switch actuating lever engaging said collar.

References Cited

UNITED STATES PATENTS

| | | | |
|---|---|---|---|
| 1,106,571 | 8/1914 | Lewis | 72—427 |
| 1,981,490 | 11/1934 | Witte | 72—424 |
| 2,079,905 | 5/1937 | Friden | 72—424 |
| 2,366,269 | 1/1945 | Lawson | 72—424 |
| 2,385,521 | 9/1945 | Mead | 221—238 |
| 2,796,616 | 6/1957 | Leinweber | 72—424 |
| 2,802,381 | 8/1957 | Leasia | 72—427 |
| 3,144,168 | 8/1964 | Campbell | 221—238 |
| 3,263,480 | 8/1966 | Carlson | 10—12.5 |
| 3,283,551 | 11/1966 | Kraft | 72—4 |

RICHARD J. HERBST, Primary Examiner

G. P. CROSBY, Assistant Examiner

U.S. Cl. X.R.

72—421, 427